Dec. 1, 1936.  C. LEE  2,062,460
WELDING MACHINE AND PROCESS OF WELDING
Original Filed Dec. 29, 1934  3 Sheets—Sheet 3
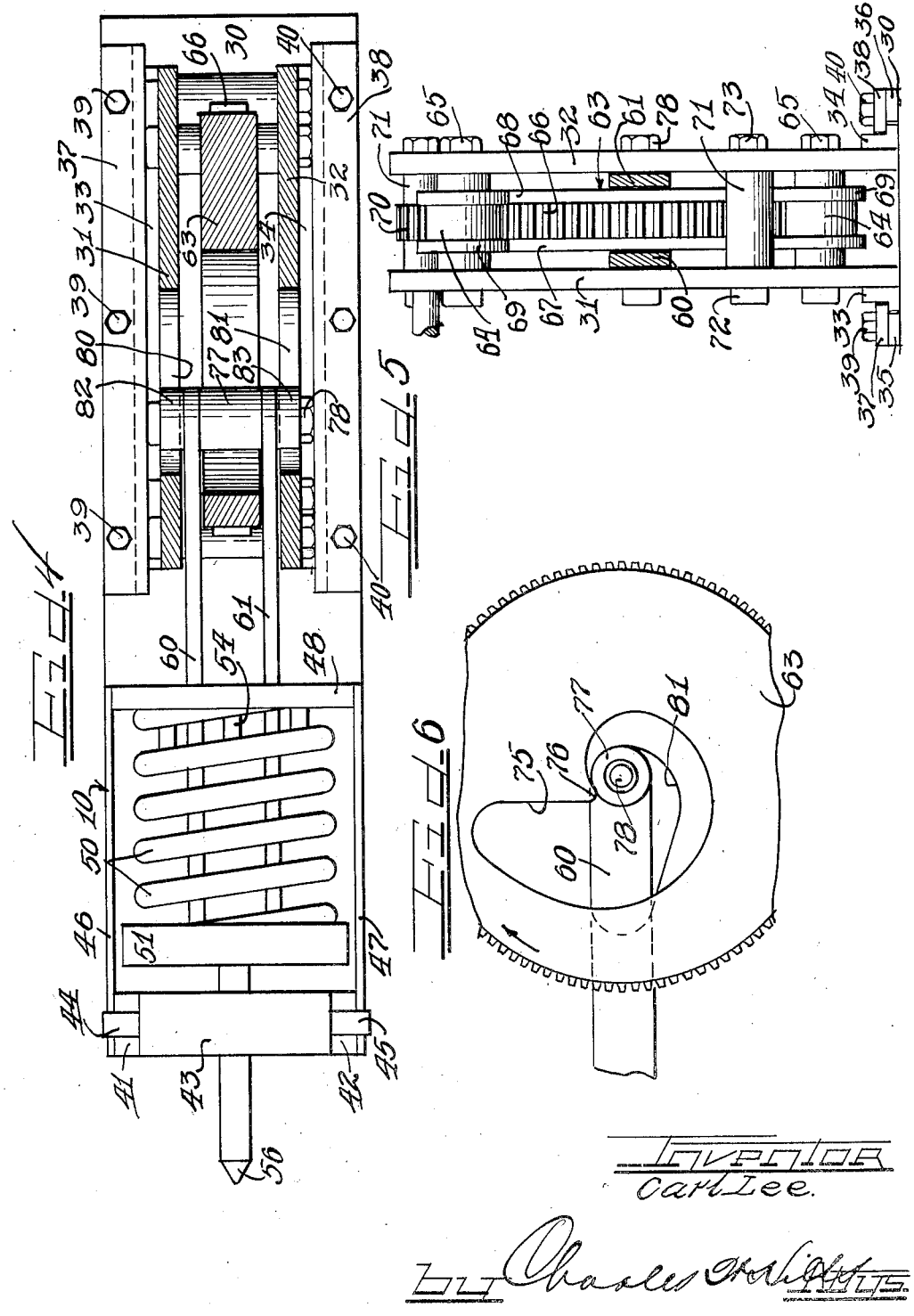
Inventor
Carl Lee.

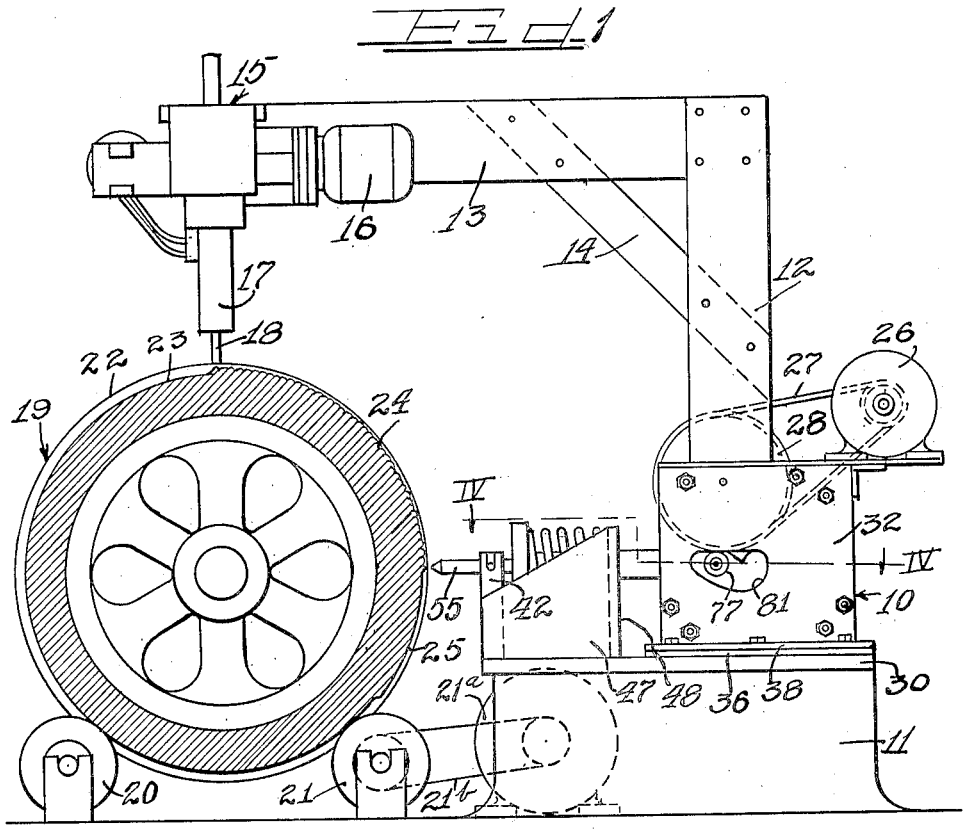
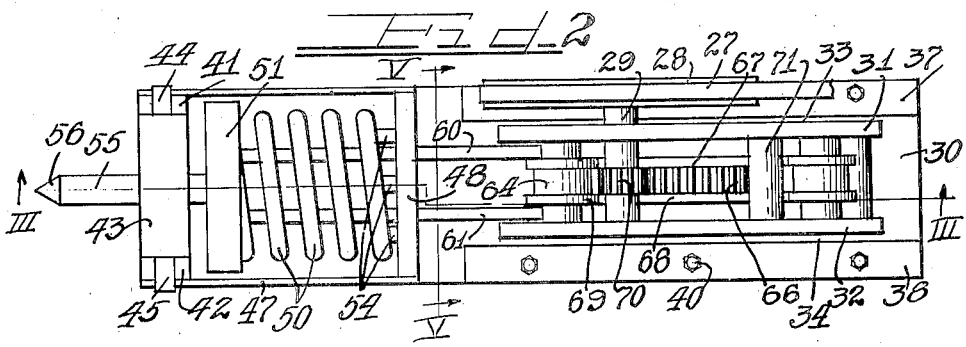

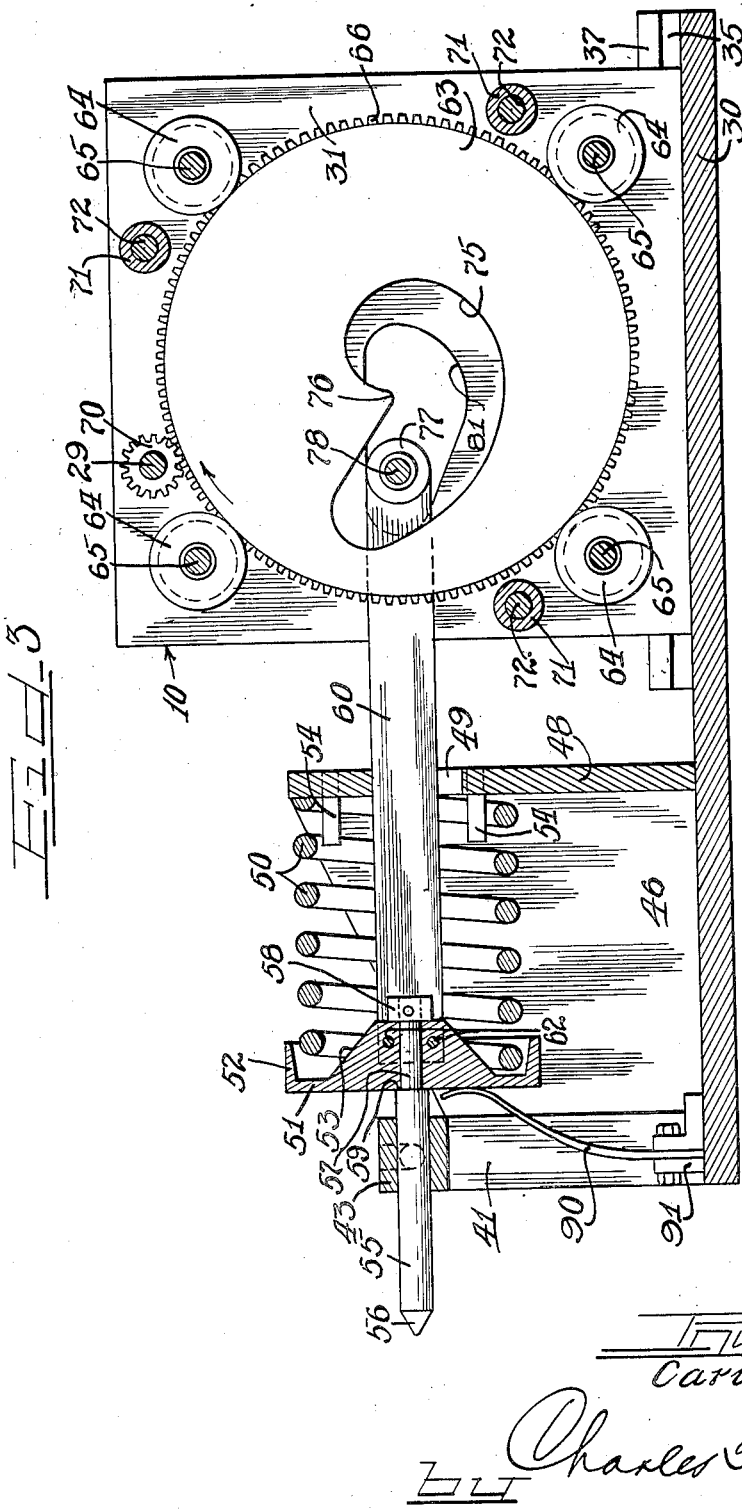

Patented Dec. 1, 1936

2,062,460

UNITED STATES PATENT OFFICE 2,062,460

WELDING MACHINE AND PROCESS OF WELDING

Carl Lee, Chicago, Ill., assignor to Peabody Coal Company, Chicago, Ill., a corporation of Illinois Original application December 29, 1934, Serial No. 759,668. Divided and this application June 22, 1935, Serial No. 27,888

12 Claims. (Cl. 29—33)

This invention relates to a welding machine for imparting desirous metallurgical properties to the welded metal and includes a process for forming improved welds. More specifically, this invention relates to a machine for retreading worn car wheels adapted to build up a welded tread thereon of improved metallurgical properties. The invention also includes a process for peening freshly welded metal to impart desired metallurgical properties thereto.

This application is a division of my copending application Serial No. 759,668, filed December 29, 1934.

It is known that a large amount of shrinkage occurs when welded metal cools. This shrinkage or contraction of the metal produces disastrous results in many welding operations. For example, in the building up of worn tires on metal wheels by welding metal onto the worn tire, it sometimes happens that the shrinkage of the welded metal around the tire sets up great compression forces within the wheel and tensile stresses in the tread and flange of the wheel or tire. These tensile stresses and strains in multiple layer welding accumulate to such an extent that frequently steel tires burst and sometimes rolled steel wheels containing the retreaded tire even crack radially from their periphery to their center.

I have found that the freshly welded metal can be suitably peened to expand the welded deposit and to impart malleability thereto so that it will stretch as it shrinks during the cooling stage and thereby reduce the tensile stresses in the welded metal and parent metal on which the weld is formed. The peening of the welded metal also relieves stresses and strains within the metal itself.

According to my process, the freshly welded metal is subjected to a series of impacts of regulated magnitude. These impacts mechanically work the freshly welded metal so as to impart malleability thereto. They also remove scale and residual matter from the surface of the weld, thereby presenting a clean surface receptive for the additional application of weld metal thereon. In addition, the beads of welded metal that are deposited during the welding operation are flattened to close the troughs between adjacent beads and provide a flat weld surface which requires only a slight machining operation to finish the surface. This, of course, effects a saving in metal because it was heretofore necessary to grind or machine off large amounts of welded metal from the corrugated weld surface to produce a finished surface.

It is therefore an object of this invention to provide a process for working welded metals to impart desired characteristics thereto.

A further object of this invention is to provide an automatic welding machine adapted to apply welding metal onto a metal to be welded and to work the freshly welded metal for imparting desired metallurgical properties thereto.

Another object of this invention is to relieve stresses and strains in welded metals.

A further object of this invention is to reduce the compression forces caused by the shrinkage of welded metal.

A further object of this invention is to improve the texture and grain structure of welded metal and to remove scale and residual matter from said metal.

A specific object of this invention is to provide a machine for retreading worn tire wheels with a deposit of metal welded on said wheel and adapted to work said metal for imparting desired metallurgical properties thereto.

Other and further objects of this invention will be apparent from the following detailed description of the annexed sheets of drawings which illustrate a preferred embodiment of this invention.

On the drawings:

Figure 1 is a side elevational view illustrating an apparatus for welding metal onto worn tires of car wheels embodying an automatic peening machine for working the freshly welded metal.

Figure 2 is a top plan view of the peening machine used in the welding apparatus of this invention.

Figure 3 is an enlarged cross-sectional view, with parts in elevation, taken substantially along the line III—III of Fig. 2.

Figure 4 is an enlarged cross-sectional view, with parts in elevation, taken substantially along the line IV—IV of Fig. 1.

Figure 5 is an enlarged cross-sectional view, with parts in elevation, taken substantially along the line V—V of Fig. 2.

Figure 6 is an enlarged broken elevational view showing the large gear of Fig. 3 in another position.

As shown on the drawings:

In Fig. 1, the reference numeral 10 indicates generally the peening hammer used in this invention mounted on a base 11. The base 11 also supports a vertical standard 12 having a horizontal arm 13 secured at right angles thereto and braced by a beam 14. The arm 13 carries a welding apparatus 15 of any standard make. The welding apparatus 15, as shown, is an electric welding machine and comprises a motor 16 and an electrode feed drive and guide 17 driven by the motor 16 for holding a welding rod electrode 18 above the work to be welded and feeding said rod to the work.

A car wheel 19 is rotatably mounted beneath the welding rod electrode 18 on a pair of rollers 20 and 21. The wheel 19 has a flange 22 and a tire or wearing surface 23 which is to be rebuilt to fill in worn-away portions with welded metal. The rollers 20 and 21 contact the tire 23 of the wheel. One or both of the rollers may be driven by a motor 21a which, for convenience, is shown to be connected to the roller 21 only by means of a belt 21b. Any other driving and supporting means may be used for rotating the wheel 19 to feed the tire surface 23 to the electrode 18 at a desired rate. Welded metal from the welding rod 18 is fused to the worn tire 23 of the wheel, as indicated at 24. This welded metal 24 is allowed to cool down as the wheel 19 rotates towards the peening apparatus 10.

The apparatus 10 peens or works the welded metal 24 to flatten out the beaded portions and removes scale and residual material to produce a clean flat surface, as indicated at 25. The working of the welded metal by the peening apparatus relieves strains within the metal and malleabilizes it so that it will stretch as it shrinks during the cooling down stage. In this manner, worn tires, such as 23, may be built up to their original diameter by the welded metal without permitting the welded metal to set up excessive compression forces within the wheel.

As shown in Fig. 1, the peening device 10 is actuated by a motor 26 which drives a belt 27 to rotate a pulley 28 keyed to a shaft 29 (Fig. 2) rotatably mounted in the housing enclosing the actuating portion of the device.

As shown in Figs. 2 to 5, inclusive, the peening device 10 is mounted on a rectangular supporting plate 30. The actuating or eccentric trip portion of the apparatus is mounted on one end of the plate 30 encased between two vertical metal plates 31 and 32 of sufficient strength to act as the frame for rotatably mounting the various rollers and gears which are positioned between the plates. The spring driving portion of the device is mounted on the other end of the plate 30.

As best shown in Figs. 2 and 5, L-shaped strips 33 and 34 are secured along the bottoms of the plates 31 and 32, respectively, with one leg thereof extending outwardly from the plates. Flat metal strips 35 and 36 (Fig. 5) are secured along the side of the supporting plate 30 in abutting relation to the outwardly extending leg of the L-shaped strips 33 and 34. Flat strips 37 and 38 are placed on top of the strips 35 and 36, respectively. These strips 37 and 38 are somewhat wider than the strips 35 and 36 and abut the upstanding legs of the L-shaped members 33 and 34 so as to form, in conjunction with the strips 35 and 36, a pair of trackways for the outwardly extending legs of the L-shaped members. The strips 37 and 38 are held on the plate 30 by means of bolts 39 and 40 extending through the strips 35 and 37, 36 and 38, respectively, into threaded engagement with the plate 30. The strips 35 and 36 are preferably formed somewhat thinner than the outwardly extending legs of the L-shaped members 34 and 35 so that when the strips 37 and 38 are clamped down on top of these strips, the plates 31 and 32 will be held against longitudinal movement. It is obvious that a loosening of the bolts 39 and 40 permits a longitudinal adjustment of the plates 31 and 32 relative to the plate 30.

A housing for a coiled spring 50 and a mounting for the peening hammer rod 55 are secured on the other end of the plate 30, as shown in Figs. 1 to 4, inclusive.

The mounting for the peening hammer rod 55 comprises a pair of vertical standards 41 and 42 secured, as by a weld, to each side of the end of the plate 30. A horizontal bar 43, provided with laterally extending axles 44 and 45, is pivotally mounted on these axles between the fingers of the bifurcated ends provided at the top of each standard 41 and 42.

Side plates 46 and 47 are secured to the sides of the standards 41 and 42, respectively. As shown in Figs. 1 and 3, these plates 46 and 47 slope upwardly and are secured at their back ends to a vertical back plate 48 at right angles thereto which is provided with an aperture 49 (Fig. 3) near the top thereof for a purpose to be hereinafter described.

The coiled spring 50 is encased within the housing formed by the vertical standards 41 and 42, the side plates 46 and 47 and the back plate 48 and a dished platen 51 having a flat outside face, an annular flange 52 extending around the periphery thereof and a frusto-conical central portion 53 (Fig. 3). Pins 54 are secured in the back plate 48 and extend into the housing for holding one end of the coiled spring 50 in proper alignment against the back plate 48. The other end of the coiled spring 50 is held in alignment around the frusto-conical portion 53 of the platen 51 and is abutted on the outside thereof by the flange 52 of this platen 51.

The peening hammer rod 55 has a peening end 56 thereon and is slidable through the pivotally mounted horizontal bar 43. The peening hammer rod 55 is provided with an end portion 57 of reduced diameter which extends through the center of the platen 51 and is secured thereto by means of a nut 58 threaded around this end portion and abutting the apex of the frusto-conical portion 53. The face of the platen 51 abuts the shoulder 59 (Fig. 3) formed at the junction point of the peening hammer rod 55 and the reduced portion 57 thereon.

A pair of elongated bars 60 and 61 are secured at one end thereof to the frusto-conical portion 53 of the platen 51. To facilitate a firm seating of the ends of the bars 60 and 61, the sides of the frusto-conical portion 53 may be flattened so that the ends of the bars will be seated against a flat surface and may be readily secured to the platen by means of pins or bolts 62 (Fig. 3) extending through the frusto-conical portion 53 and the ends of the bars.

The bars 60 and 61 extend through the aperture 49 in the back plate 48 and into the space between the plates 32 and 33 of the actuating portion of the device.

A large centerless gear 63 is rotatably mounted between the plates 31 and 32 on rollers 64 which are rotatably mounted on axles or bolts 65 extending through the plates. As best seen in Figs. 2, 3 and 5, the gear 63 is provided with gear teeth 66 around the periphery thereof. The gear teeth 66, however, are located only in the central portion of the periphery and do not extend to the sides of the gear so as to provide smooth circular surfaces 67 and 68 around the periphery of the gear on each side of the gear teeth. The rollers 64 are formed with side flanges 69 on each side thereof adapted to bear against the cylindrical surfaces 67 and 68 for rotatably supporting the gear. The central portions of the rollers 64 are set back sufficiently to be maintained in spaced relationship from the gear teeth which abut the inside edges of the flanges 69 and prevent displacement of the gear.

A pinion gear 70 (Figs. 3 and 5) is secured on the shaft 29 and meshes with the gear teeth 66 of the gear 63. As pointed out above, the shaft 29 is driven by the motor 26.

The plates 31 and 32 are held in proper spaced relation by a plurality of spaced sleeves 71 abutting the inside surfaces of the plates at their ends and being secured by means of bolts 72 extending through the plates. The bolts 72 are secured by means of nuts 73. These spacer sleeves 71 and bolts 72 may be placed at various points between the plates where they will not interfere with the mechanical operation of the gear mounting therein.

The center of the gear 63, as shown in Figs. 3 and 6, has a cam-shaped aperture 75 cut therethrough with a rounded inturned portion 76 for a purpose to be hereinafter described.

The ends of the bars 61 and 62 which extend into the space between the plates 31 and 32 have a roller 77 rotatably mounted therebetween on a bolt or shaft 78, (Figs. 3 and 6) adapted to roll along the surfaces defined by the cam aperture 75 in the gear 63.

As best shown in Figs. 3 and 4, the plates 31 and 32 are provided in their central portions with openings 80 and 81 in alignment with the cam aperture 75 in the gear 63. The bolt 78 forming the axis for the roller 77, as pointed out above, extends through the ends of the bars 60 and 61 for rotatably supporting the roller 77 therebetween. As shown in Fig. 4, this bolt 78 also rotatably supports a pair of circular discs 82 and 83 which abut the outer sides of the bars 60 and 61, respectively. These discs 82 and 83 are adapted to roll along the walls defining the apertures 80 and 81, respectively.

When the gear 63 is rotated in a clockwise direction, as indicated in Figs. 3 and 6, the roller 77 contacts the curved surface of the cam aperture and is driven back to the position wherein the roller is retained behind the portion 76 of the cam aperture, as shown in Fig. 6. A further rotation of the gear releases or trips the roller and allows the spring to expand to drive the hammer rod 55. The discs 82 and 83 ride along the walls defining the openings 80 and 81 at points where the roller 77 does not contact the cam surface of the gear. Since there is somewhat of a downward kick when the roller 77 is released from the portion 76 of the cam opening 75, the aperture 49 in the spring back plate 48 is large enough to permit a downward movement of the bars 60 and 61, as shown in Fig. 3. These bars are pivoted relative to the base plate 30 by means of the horizontal bar 43.

The cam aperture 75 in the gear is designed so as to provide for a uniform power requirement during all stages of compression of the spring 50. In other words, when the spring is in expanded position, the first stages of compression of the spring do not require as much force as the last stages of compression. Therefore, the cam surface moves the roller 77 backward with more rapidity than when the spring is more compressed. In this manner, an even amount of driving force is used throughout all compression stages of operation of the device. As soon as the roller 77 is released from behind the portion 76 of the cam aperture 75, the hammer head or point 56 strikes against the weld and is retrieved as described below. The roller then immediately contacts the opposite surface of the cam aperture and the spring is immediately started on its compression cycle. Thus, the motor driving the apparatus is not allowed to run free for any appreciable period during the expansion cycle of the machine and a uniform amount of power is used for the compression cycle of operation.

As shown in Fig. 3, a spring leaf 90 is mounted in a base 91 on the rectangular plate 30 at a point between the vertical standards 40 and 41. The spring leaf 90 contacts the face of the platen 51 when the spring 50 is in expanded position and is driven forward with the platen 51 on the power or impact stroke. The entire peening device is set up so that the hammer head or point 56 is spaced away from the weld a distance equal to only a part of the distance between the bar 43 and the platen 51 when the spring 50 is fully expanded. This point 56 strikes the weld and absorbs the blow before the platen 51 reaches the bar 43 and before the roller 77 strikes the cam 75 and before the rollers 82 and 83 (Fig. 4) strike the side plates 31 and 32.

After the blow is absorbed by the point 56 striking the weld, the spring 90 retrieves the platen 51 back into contact with the spring 50 and at the same time the point 56 is drawn away from the weld so that it will not drag on the weld. The leaf spring, if desired, may be replaced by a helical spring disposed around the rod 55 between the bar 43 and platen 51.

If desired, the side plates 31 and 32 may have a bottom and two end plates welded thereto for forming an oil tight container for the gears and rollers therebetween. A top cover may also be secured on the plates. The so-formed container can then be partially filled with grease or oil for lubricating the gears and rollers.

Anti-friction ball or roller bearings may be used for mounting any or all of the rotatable parts.

The operation of the peening device may be briefly described as follows:

The plate 30 supporting the device is mounted in fixed position so that the hammer head 56 will strike the work to be peened, as described above. The actuating portion of the machine is then positioned so as to compress the spring 50 to any desired degree when the roller 77 is in its center position. This is accomplished by sliding the plates 31 and 32 in the trackways described above in proper spaced relation from the spring back plate 48. The plates 31 and 32 are then fixedly clamped with respect to the base plate 30 by tightening the bolts 39 and 40 as described above.

The means for providing relative movement between the actuating portion and the spring portion of the machine thus render it possible to vary the impact force of the machine without changing the coiled spring. In other words, the coiled spring may be compressed any amount from zero to its maximum, depending upon the relative position of the actuating portion of the device with respect to the fixed back plate 48. For maximum compression of the spring to produce a maximum impact, the slidable actuating portion of the device is moved away from the plate 48 so that the cam 75 starts to compress the spring immediately after the previous expansion stroke and compresses the spring to its maximum amount.

For lesser compression, to produce lesser impact with the same spring, the slidable actuating portion is moved toward the plate 48 so that the roller 77 is relatively nearer the center of the cam aperture 75 when released from the previous stroke. Therefore, the cam 75 does not engage the roller 77 until the gear 63 has made a part of one turn, and when the roller 77 is drawn to the center of the gear behind the cam portion 76, the spring will not be compressed to its full amount. The partially compressed spring, when released, will deliver a lesser blow. Obviously, the slidable actuating portion of the device may be moved so close to the plate 48 that the roller will remain in the center of the cam aperture 75 and a rotation of the gear 63 will not compress the spring at all. It is obvious that variations in the impact force delivered to the hammer head 56 can be provided without changing the spring 50.

It should be understood, however, that the spring may be replaced with heavier or lighter springs so that the device is capable of delivering impact blows of any desired magnitude.

When the apparatus is used in connection with the retreading of worn metal tires of metal wheels, such as car wheels, with welded metal, it has been found to be desirable to use a spring pressure of about 135 pounds and to move the hammer head back about 2⅜ inches from the work during the compression operation. When welding at a lineal speed of about 6 to 7 inches per minute, it has been found that the device should be operated so as to deliver about sixty impacts per minute. This provides an impact blow for each one-eighth inch of the welded metal, and since the point of the hammer head 56 is generally more than one-eighth inch in diameter, it follows that an impact blow is delivered to all parts of the weld surface.

The impact blows may be delivered to the welded metal when the metal is at any temperature below the freezing point. Thus, in some instances, it may be desirable to position the peening hammer immediately after the welding apparatus or to preheat the welded metal before subjecting it to the impact blows. I have obtained very excellent results in relieving stresses set up by the welded metal in car wheels that are retreaded with welded metal by peening the weld at temperatures between about 250 to 350° F.

As pointed out above, the peening operation performs many desirable results in addition to the malleabilizing of the welded metal. It has been found that the peening of the weld removes scale and residual matter deposited on the weld and thereby presents a clean surface for additional application of welding material. The peening operation also flattens out the rounded beads of weld metal that are always deposited by a welding operation and thereby closes the troughs between adjacent beads of metal. This provides a flat finished surface instead of a corrugated surface and thereby reduces the necessity of excessive machining to produce the desired smooth surface.

It should be understood that it is not necessary to peen the weld metal while the same is in its heated condition, since cold working operations also produce desirable results.

I am aware that many changes may be made and numerous details of construction may be varied through a wide range without departing from the principles of this invention, and I, therefore, do not purpose limiting the patent granted herein otherwise than necessitated by the prior art.

I claim as my invention:

1. A machine for welding metals onto metallic articles and for working said metals to impart desirable characteristics thereto comprising means for holding a welding rod, means for feeding the article to be welded into close proximity to the end of the welding rod, a hammer having a small peening head adapted to strike against the welded metal just subsequent to a freezing of the metal, and means for driving said hammer to deliver impact blows of predetermined magnitude and frequency.

2. A machine for applying and working welded metals on metallic articles which comprises an electric welding device, means for feeding an electrode of metal to be welded from said device, means for advancing an article to receive metal from said electrode thereon into close proximity with the end of the electrode, a peening hammer mounted adjacent to said article at a point in advance of the welding rod for striking against the welded metal while the same is in a heated condition, and means for driving said peening hammer to deliver impact blows of predetermined magnitude and frequency.

3. A machine for welding metal onto metallic articles and for working said metal to impart desirable characteristics thereto comprising a welding rod, means for feeding the article to be welded below said rod, means for welding the metal of said rod onto said article, a peening hammer adapted to strike against said welded metal while the same is in a heated condition, and means for driving said hammer to deliver impact blows of predetermined magnitude and frequency.

4. A machine for retreading worn metal surfaces on wheels comprising a pair of rollers for rotatably mounting a wheel to be retreaded, a welding metal electrode above said rollers, means for fusing the metal of said electrode onto the worn surface of said wheel, means for rotating said wheel below said electrode to feed the worn metal surface thereto at a predetermined rate, a peening hammer mounted to strike against the welded metal on said wheel, and means for driving said hammer to deliver impact blows of predetermined magnitude and frequency.

5. A machine for building up a welded surface on car wheels comprising a base, a peening device mounted on said base, a vertical standard secured on said base and extending above said peening device, a horizontal arm secured near the top of said standard, a welding apparatus mounted on said arm, a pair of rollers in spaced relation below said welding apparatus for mounting a wheel to be welded thereby, means rotating said wheel to feed the surface to be welded to said welding apparatus at a desired rate, and means for adjusting said peening device to deliver impact blows of desired magnitude and frequency against the welded metal while said metal is in a heated condition.

6. A machine for successively welding metal onto an article and working said welded metal to impart desired characteristics thereto comprising means for mounting the article to be welded, a welding device, means for feeding an electrode of metal to be welded on said article through said welding device, means for advancing the article to be welded into close proximity with the end of the electrode, a peening hammer mounted in advance of said welding device adapted to strike against the freshly welded metal on the article, and means for driving said peening hammer to deliver impact blows of predetermined magnitude and frequency.

7. The process of welding which comprises successively fusing metal to an article and peening adjacent small areas of the freshly fused metal to impart desired metallurgical properties thereto and to remove scale therefrom whereby additional metal may be securely fused thereon.

8. The process of welding which comprises successively fusing metal to a metal surface and peening adjacent small areas of the freshly fused metal with an impact force of regulated magnitude and frequency to malleabilize said metal and prepare the same for the reception of additional metal thereon.

9. A process of providing metal articles with a malleabilized welded metal surface which comprises fusing a molten metal to said articles and subjecting the fused metal over small adjacent areas to successive impact blows of regulated magnitude as said metal is cooling.

10. The process of welding which comprises fusing molten metal with a metal article, allowing said metal to cool to temperatures of about 250 to 350° F., and subjecting said metal at these temperatures to impact blows of regulated frequency and magnitude.

11. The process of retreading worn tires of car wheels which comprises welding a layer of metal to the worn surface of said tire, uniformly peening said layer before the metal has cooled with impact blows of predetermined magnitude and repeating said welding and peening operations until the worn surface is built up to the desired size.

12. The process of retreading worn tires of car wheels which comprises welding a layer of metal to the worn surface of said tire, allowing the metal of said layer to cool to temperatures of about 250 to 350° F., peening the so cooled metal with successive impact blows equivalent to the blow obtained by suddenly releasing a spring held under 135 pounds compression.

CARL LEE.